United States Patent
Cao et al.

(10) Patent No.: US 9,584,334 B2
(45) Date of Patent: Feb. 28, 2017

(54) SYSTEM AND METHOD FOR VIDEO MULTICASTING

(71) Applicant: Huawei Technologies Co., Ltd., Shenzhen (CN)

(72) Inventors: Yu Cao, Kanata (CA); Jianglei Ma, Ottawa (CA); Mohamed Adel Salem, Kanata (CA); Amine Maaref, Kanata (CA); Mohammadhadi Baligh, Kanata (CA)

(73) Assignee: Futurewei Technologies, Inc., Plano, TX (US)

( * ) Notice: Subject to any disclaimer, the term of this patent is extended or adjusted under 35 U.S.C. 154(b) by 111 days.

(21) Appl. No.: 14/166,235

(22) Filed: Jan. 28, 2014

(65) Prior Publication Data
US 2015/0215133 A1    Jul. 30, 2015

(51) Int. Cl.
*H04L 12/18* (2006.01)
*H04N 21/6405* (2011.01)
*H04W 4/06* (2009.01)
*H04L 29/06* (2006.01)

(52) U.S. Cl.
CPC ...... *H04L 12/1886* (2013.01); *H04L 65/4069* (2013.01); *H04L 65/607* (2013.01); *H04N 21/6405* (2013.01); *H04W 4/06* (2013.01); *H04L 65/604* (2013.01)

(58) Field of Classification Search
None
See application file for complete search history.

(56) References Cited

U.S. PATENT DOCUMENTS

| | | | |
|---|---|---|---|
| 2007/0133691 A1 | 6/2007 | Kozat | |
| 2007/0217432 A1* | 9/2007 | Molisch et al. | 370/400 |
| 2007/0230564 A1* | 10/2007 | Chen | H04N 21/234327 375/240.01 |
| 2009/0147746 A1 | 6/2009 | Alay et al. | |
| 2011/0099437 A1* | 4/2011 | Ramakrishnan et al. | 714/704 |
| 2011/0228845 A1* | 9/2011 | Banerjee | H04L 1/0002 375/240.07 |
| 2011/0246845 A1 | 10/2011 | Hannuksela et al. | |
| 2013/0265966 A1 | 10/2013 | Yu et al. | |
| 2014/0019830 A1* | 1/2014 | Chen et al. | 714/776 |

OTHER PUBLICATIONS

International Search Report and Written Opinion of Patent Cooperation Treaty (PCT), International Application No. PCT/US15/11915, Applicant Huawei Technologies Co., Ltd., date of mailing Jun. 18, 2015, 11 pages.

(Continued)

*Primary Examiner* — Christopher Crutchfield
*Assistant Examiner* — Alan Lindenbaum
(74) *Attorney, Agent, or Firm* — Slater Matsil, LLP

(57) ABSTRACT

A method for operating a cooperating user equipment (CUE) includes receiving a plurality of video packets that are hierarchically modulated (HM), with each video packet corresponding to a separately encoded video layer that is encoded with a rateless code, and decoding the plurality of video packets. The method also includes generating one or more supplemental packets to assist in the decoding of the plurality of video packets, and transmitting the one or more supplemental packets.

27 Claims, 10 Drawing Sheets

(56) References Cited

OTHER PUBLICATIONS

Chang, Y. C., et al., "A Low Complexity Hierarchical QAM Symbol Bits Allocation Algorithm for Unequal Error Protection of Wireless Video Transmission," Consumer Electronics, IEEE Transactions on, vol. 55, No. 3, Aug. 2009, pp. 1089-1097.
Keller, L., et al., "MicroCast: Cooperative Video Streaming on Smartphones," MobiSys'12, Proceedings of the 10th international conference on Mobile systems, applications, and services, Jun. 25-29, 2012, pp. 57-70.
Khalek, A., et al., "Energy-Efficient Cooperative Video Distribution with Statistical QoS Provisions over Wireless Networks," IEEE Transactions on Mobile Computing, vol. 11, No. 7, Jul. 2012, pp. 1223-1236.
Nazir, S., et al., "Scalable Video Streaming Techniques over Cooperative Relay Networks," International Journal of Computer Application (0975-8887), vol. 66, No. 13, Mar. 2013, pp. 18-24.

\* cited by examiner

SYSTEM AND METHOD FOR VIDEO MULTICASTING

TECHNICAL FIELD

The present disclosure relates generally to digital communications, and more particularly to a system and method for video multicasting.

BACKGROUND

Video is one of the main sources of network traffic in current and future mobile communication systems. Due to the increasing data size of high definition video content, video is one of the most demanding applications of user equipment, such as smart phones, display devices, and the like. Video traffic already accounts for more than half of total network traffic and is expected to continue to increase year after year. The streaming of video also utilizes a significant amount of communications system resources. Therefore, an efficient video streaming system is important for next generation communications systems.

SUMMARY OF THE DISCLOSURE

Example embodiments of the present disclosure which provide a system and method for video multicasting.

In accordance with an example embodiment of the present disclosure, a method for a cooperating user equipment (CUE) is provided. The method includes receiving, by the CUE, a plurality of video packets that are hierarchically modulated (HM), with each video packet corresponding to a separately encoded video layer that is encoded with a rateless code, and decoding, by the CUE, the plurality of video packets. The method also includes generating, by the CUE, one or more supplemental packets to assist in the decoding of the plurality of video packets, and transmitting, by the CUE, the one or more supplemental packets.

In accordance with another example embodiment of the present disclosure, a method for operating a target user equipment (TUE) is provided. The method includes receiving, by the TUE, a plurality of video packets that are hierarchically modulated (HM), with each video packet corresponding to a separately encoded video layer that is encoded with a rateless code, and decoding, by the TUE, a subset of the plurality of video packets. The method also includes receiving, by the TUE, one or more supplemental packets from a CUE, the one or more supplemental packets to assist in the decoding of the plurality of video packets, and decoding, by the TUE, the plurality of video packets utilizing the one or more supplemental packets.

In accordance with another example embodiment of the present disclosure, a method for operating a video source is provided. The method includes generating, by the video source, a plurality of hierarchically modulated (HM) video packets, with each HM video packet corresponding to a separately encoded video layer that is encoded with a rateless code, and transmitting, by the video source, the plurality of HM video packets to at least one user equipment (UE).

In accordance with another example embodiment of the present disclosure, a CUE is provided. The CUE includes a receiver, a processor operatively coupled to the receiver, and a transmitter operatively coupled to the processor. The receiver receives a plurality of video packets that are hierarchically modulated (HM), with each video packet corresponding to a separately encoded video layer that is encoded with a rateless code. The processor decodes the plurality of video packets, and generates one or more supplemental packets to assist in the decoding of the plurality of video packets. The transmitter transmits the one or more supplemental packets.

In accordance with another example embodiment of the present disclosure, a TUE is provided. The TUE includes a receiver, and a processor operatively coupled to the receiver. The receiver receives a plurality of video packets that are hierarchically modulated (HM), with each video packet corresponding to a separately encoded video layer that is encoded with a rateless code, and receives one or more supplemental packets from a cooperating user equipment (CUE), the one or more supplemental packets to assist in decoding of the plurality of video packets. The processor decodes a subset of the plurality of video packets, and decodes the plurality of video packets utilizing the one or more supplemental packets.

One advantage of an embodiment is that communications system resource usage is significantly reduced. The reduction in communications system resources required to support video streaming permits video streaming to a larger number of user equipments, as well as reduces the impact of video streaming on the overall performance of the communications system.

A further advantage of an embodiment is that user equipments of differing capability and/or experience requirements are supported with a flexible video streaming system.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to video multicasting. For example, a cooperating user equipment receives a plurality of hierarchically modulated (HM) video packets, with each HM video packet corresponding to a separately encoded video layer encoded with a rateless code, decodes the plurality of HM video packets, and receives feedback from a target user equipment (TUE) comprising a quality of experience requirement and information about HM video packet decoding performance by the TUE. The cooperating user equipment also generates one or more supplemental packets in accordance with the feedback, and transmits the one or more supplemental packets.

The present disclosure will be described with respect to example embodiments in a specific context, namely communications systems that support video streaming to user equipment (UE). The disclosure may be applied to standards compliant communications systems, such as those that are compliant with Third Generation Partnership Project (3GPP), IEEE 802.11, and the like, technical standards, and non-standards compliant communications systems, that support video streaming.

Figure 1:
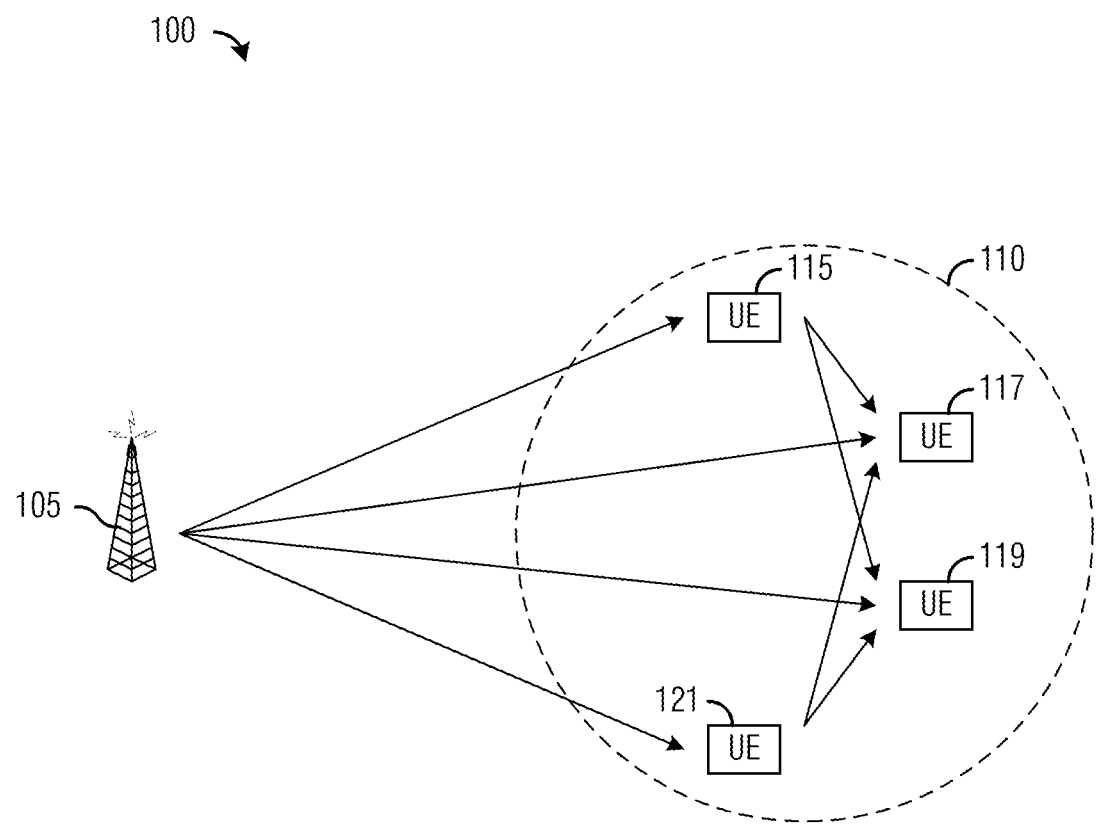
FIG. 1 illustrates an example communications system according to example embodiments described herein.

FIG. 1 illustrates an example communications system 100. Communications system 100 includes a video source 105 streaming video to UE operating within a coverage area 110, including but not limited to UE 115, UE 117, UE 119, and UE 121. Video source 105 may stream video to the UEs by broadcasting video packets to the UEs or multicasting video packets to the UEs. While it is understood that communications systems may employ multiple video sources capable of communicating with a number of UE, only one video source, and a number of UEs are illustrated for simplicity.

Video source 105 may also be implemented as a stand-alone device, such as a video server, a multi-media server, and the like, or a transmission point coupled to a video source, where the transmission point may be an evolved NodeB (eNB), a NodeB, a base station, a controller, a communications controller, and the like. The UEs may also be referred to as terminals, users, subscribers, mobiles, mobile stations, and the like.

As shown in FIG. 1, the UEs are also capable of UE cooperation, wherein one UE may transmit some or all of the video that it received from video source 105 to another UE. As an example, UE 115 may transmit some or all of the video received from video source 105 to UE 117 and/or UE 119. UE cooperation may be used to simplify the operation of video source 105 since it may eliminate the need for video source 105 to re-transmit video that it has already transmitted.

Today's UE may have very different processing and/or displaying capabilities. As an example, an older UE limited by its display or processing power may be capable of displaying only low resolution video, while a modern UE may be fully capable of displaying 1080p HD video with surround sound audio. Furthermore, different UE owners may have different requirements. With future communications systems shifting to a more UE centric design, meeting quality of experience (QoE) requirements of owners may become more important than providing a sufficient data rate. The heterogeneity of QoE requirements of different owners may pose a significant challenge for video multicasting.

Scalable video coding (SVC) extension of the H.264 advance video codec (AVC) video compression format provides different dimensions of scalability of video source, which allows for progressive improvement of play-back quality depending on device capabilities by decoding more layers. SVC enables the encoding of a high quality video stream containing multiple prioritized layers, each serving a decreasing importance in video reconstruction. As an example, an encoded video may include a base layer and one or more enhancement layers. The scalability modalities include temporal scalability, spatial scalability, signal-to-noise ratio (SNR) and/or fidelity scalability, or a combination thereof.

Hierarchical modulation (HM) is a technique proposed to provide different classes of data to UE in different reception conditions. In conventional quadrature amplitude modulation (QAM), such as quadrature phase shift keying (QPSK), 16-ary QAM, 64-ary QAM, and the like, each bit that is modulate has the same priority and is protected equally. HM allows for the modulation of two or more bits streams with different transmission qualities and the transmission of the two or more modulated bit streams over a single frequency channel. HM is a part of the digital video broadcasting—terrestrial (DVB-T) and digital video broadcasting—handheld (DVB-H) standards. Recently, HM has been used in to provide unequal error protection (UEP) for wireless video transmissions.

Fountain codes, also commonly referred to as rateless codes, may be an efficient application layer forward error correction (FEC) code that are useful for video multicast. Fountain codes are mainly designed for erasure channels. A desirable property of fountain codes is that, with fountain encoded information blocks, as long as a receiver receives enough fountain encoded packets, the receiver can decode the information regardless of which fountain encoded packets are received. Furthermore, the current implementation of fountain codes, raptor codes, and the like, has small encoding and decoding complexities. Therefore, fountain codes are suitable for applications of data and video broadcasting.

With the availability of direct communications, such as over device-to-device (D2D) links, UEs located in close proximity can cooperate with each other via D2D link to help improve system performance, i.e., a first UE can receive signals that are originally sent to a second UE and then forward the information to the second UE via a D2D link. It has been shown that UE cooperation via D2D connectivity can significantly boost communications system throughput and coverage.

According to an example embodiment, a video streaming system and method multicasts video to a group of UEs is provided. The video source is scalable and the UEs in the group have different QoE requirements. Furthermore, device-to-device (D2D) links are available among the UEs in the group so that the UEs are capable of communicating directly with one another to support UE cooperation.

Figure 2:
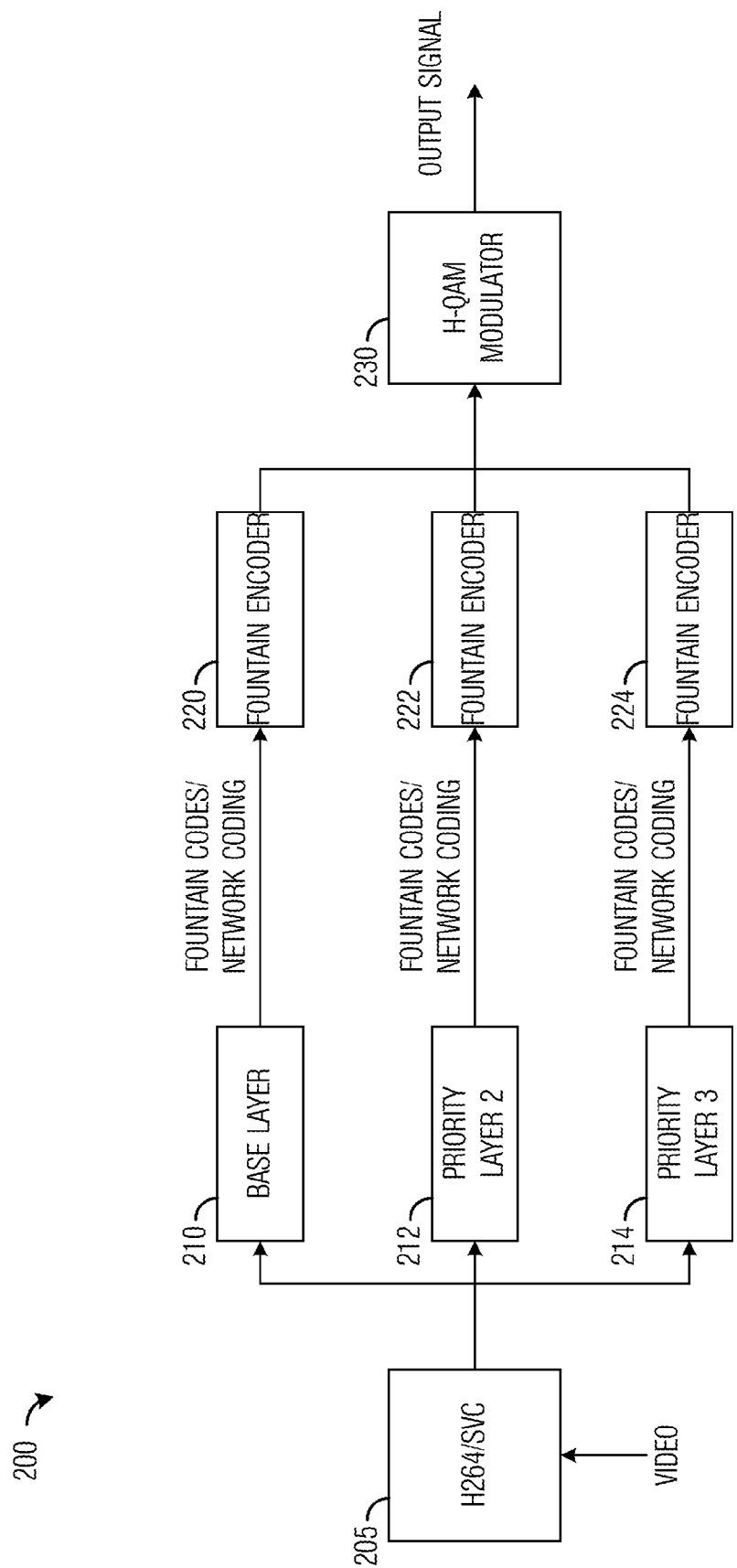
FIG. 2 illustrates an example video packet generating system according to example embodiments described herein.

FIG. 2 illustrates an example video packet generating system 200. Video packet generating system 200 may be used to generate video packets to be transmitted by example embodiments of video streaming system and method as discussed herein. Video packet generating system 200 includes a H.264 and/or SVC encoder 205 which may receive a video stream as input and encodes the video stream as using a H.264 and/or SVC codec. The encoded video stream may be partitioned into multiple code blocks with each code block generally including a group of pictures (frames) (GOP). Each code block may include multiple video layers, including a base layer 210, a priority layer 2 212, and a priority layer 3 214, with each priority layer including 1 or more enhancement layers. Base layer 210 may be required to provide a basic level or quality of video playback and may be considered to be the most important layer. Enhancement layers may provide additional quality to the video playback. It is noted that although the discussion focuses on the code blocks including 3 layers, the code blocks may include any number of layers, such as 1, 2, 3, 4, 5, and the like.

The multiple layers may be separately encoded using a rateless code, such as a fountain code, a network code, and the like. As an example, the base layer may be encoded by fountain encoder 220 to produce fountain encoded packets. Similarly, enhancement layer(s) associated with priority layer 2 may be encoded by fountain encoder 222 and enhancement layer(s) associated with priority layer 3 may be encoded by fountain encoder 224. The fountain encoded packets may be modulated using HM such as hierarchical QAM (H-QAM) by a H-QAM modulator 230 to produce an output signal. H-QAM modulator 230 produces a HM video packet for each video fountain encoded packet. As an example, as shown in FIG. 2, there are three video layers with multiple fountain encoded packets being produced by each fountain encoder per video layer. As an illustrative example, consider a situation where 10 fountain encoded packets are produced by a fountain encoder associated with each video layer for a single video block then there are total of 30 HM modulated video packets for this video block. The output signal may be transmitted or save for subsequent transmission.

Figure 3:
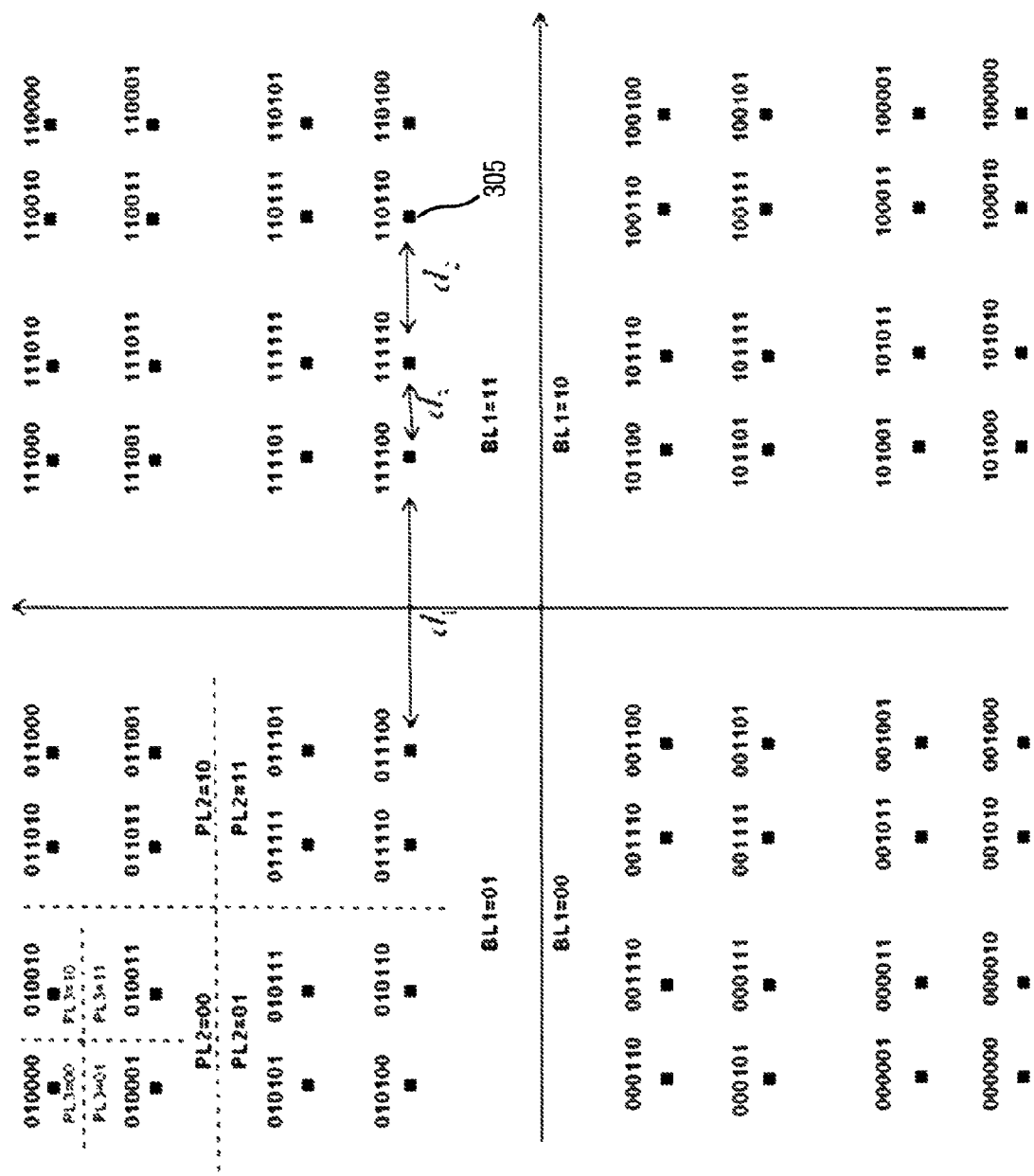
FIG. 3 illustrates an example constellation of an H-QAM symbol according to example embodiments described herein.

FIG. 3 illustrates an example constellation 300 of an H-QAM symbol. Constellation 300 may be for H-QAM symbol with 64-QAM. With 64-QAM, 6 bits of information may be transmitted and a different number of bits may be used for different layers. As an example, consider a point 305 associated with 6-bit string "110110" where bits '11' may be representative of data for a base layer, bits '01' may be representative of data for priority layer 2, and bits '10' may be representative of data for priority layer 3. Euclidean distances d1, d2, and d3 represent distances between different points in constellation 300. Distance d1 may be representative of a distance between points for the base layer, distance d2 may be representative of a distance between points of priority layer 2, and distance d3 may be representative of a distance between points of priority layer 3. As shown in constellation 300, d1>d2>d3, which means that the base layer has greater protection from errors than priority layer 2, which has greater protection from errors than priority layer 3. In general, parameters $\alpha$ and $\beta$ may be expressed to achieve UEP for the different layers, where $$\alpha = \frac{d1}{d2} \text{ and } \beta = \frac{d2}{d3}.$$

It is noted that the assignment of bits to the layers and the parameters $\alpha$ and $\beta$ are for discussion purposes only and that other possible bit assignments and parameter values are possible.

Figure 4:
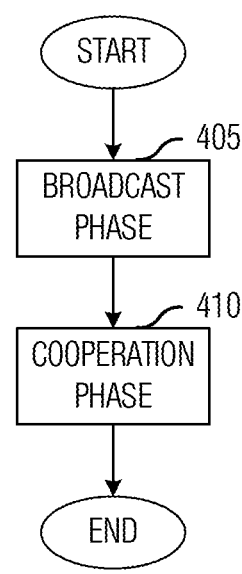
FIG. 4 illustrates a flow diagram of example operations occurring in a video streaming system according to example embodiments described herein.

FIG. 4 illustrates a flow diagram of example operations 400 occurring in a video streaming system. Operations 400 may be indicative of operations occurring in a video streaming system as video is being multicast to UE.

Operations 400 may begin with the video streaming system operating in a first phase, a broadcast phase (block 405). According to an example embodiment, in the broadcast phase, video packets comprising video separated into multiple video layers (such as a base layer, a priority layer 2, and a priority layer 3, for example) by SVC, separately encoded using a rateless code (e.g., a fountain code or a network code), and hierarchically modulated may be broadcast to a plurality of UEs. In a second phase, a cooperation phase, supplemental packets that are also encoded with a rateless code may be transmitted to allow UEs that have trouble decoding video packets to meet their QoE requirement decode the video packets (block 410). Due to the nature of rateless coding, specific supplemental packets for undecodable video packets are not required, instead supplemental packet may be generated for a specified video layer and may be used to supplement video information of any video packet of the specified video layer, thereby allowing the recovery of video information of the video packet.

Figure 5:
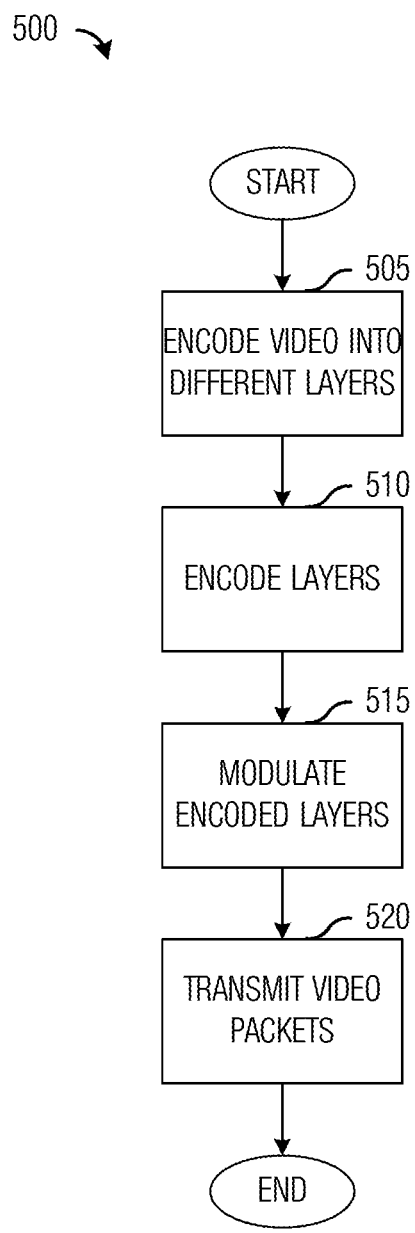
FIG. 5 illustrates a flow diagram of example operations occurring in a video source of a video streaming system as the video source transmits video packets according to example embodiments described herein.

FIG. 5 illustrates a flow diagram of example operations 500 occurring in a video source of a video streaming system as the video source transmits video packets. Operations 500 may be indicative of operations occurring in a video source, such as a video server, a multi-media server, and the like, or a transmission point coupled to a video source, where the transmission point may be an evolved NodeB (eNB), a NodeB, a base station, a controller, a communications controller, and the like, as the video source streams video to a plurality of UEs.

Operations 500 may begin with the video source encoding a video being streamed into multiple layers (block 505). The encoding of the video may be performed using SVC, which may generate a plurality of layers from the video, including a base layer and one or more enhancement layers. According to an example embodiment, the plurality of layers may be partitioned into a base layer and one or more priority layers, with each priority layer including one or more enhancement layers. The video source may encode the multiple layers using a rateless code (block 510). The video source may separately encode the multiple layers using a rateless code, such as a fountain code, a network code, and the like. As an example, consider a situation wherein the video is encoded using SVC to produce a base layer, a priority layer 2, and a priority layer 3. The base layer, the priority layer 2, and the priority layer 3 may be separately encoded with the rateless code to produce a plurality of encoded layers. The video source may modulate the plurality of encoded layers to produce video packets (block 515). As an example, the video source may use HM to modulate the plurality of encoded layers to provide UEP for the encoded layers of the plurality of encoded layers. The video packets, encoded using HM, may correspond to separately encoded video layers that have been encoded with the rateless code. Each modulation symbol of hierarchical modulation may represent information bits from multiple video packets corresponding to multiple video layers. As an illustrative example, HM (such as H-QAM) may provide a highest amount of protection to an encoded base layer, a middle amount of protection to an encoded priority layer 2, and a lowest amount of protection to an encoded priority layer 3. The video source may transmit the video packets (block 520). Collectively, blocks 505, 510, 515, and 520 may be referred to as the broadcast phase.

Figure 6:
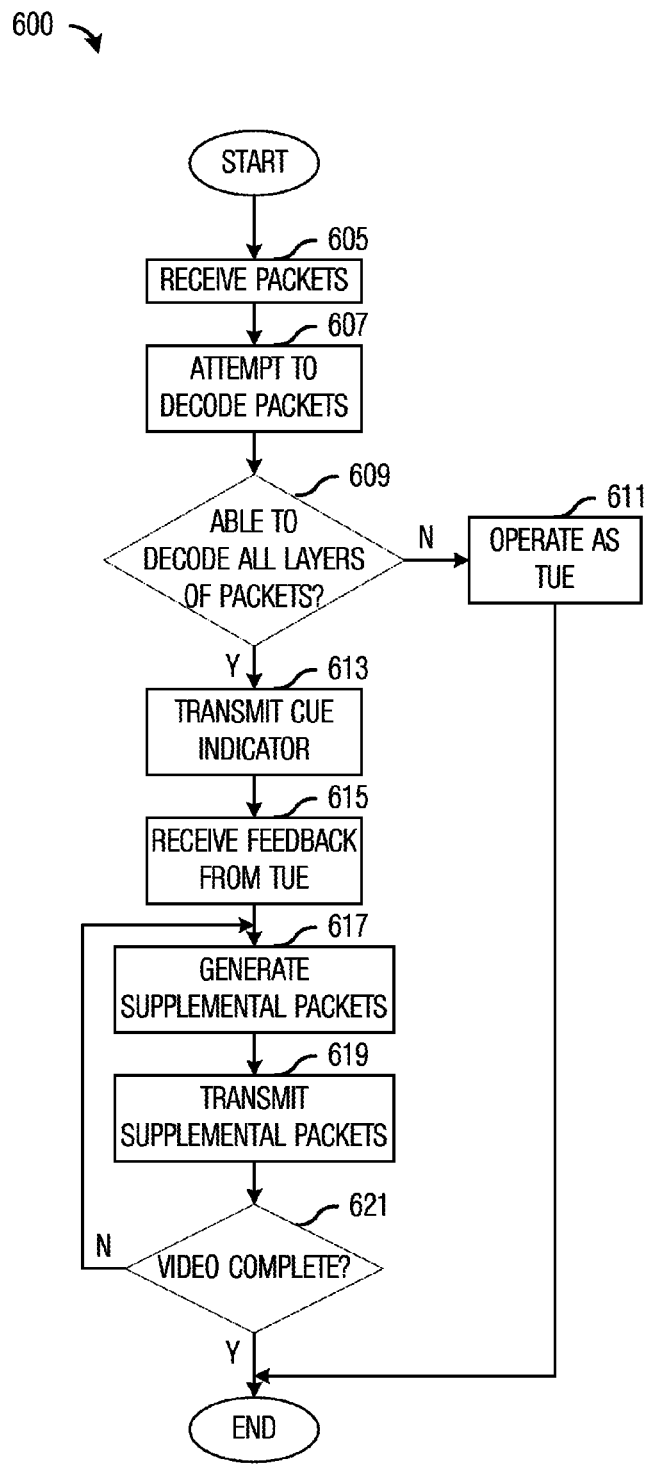
FIG. 6 illustrates a flow diagram of example operations occurring in a UE of a video streaming system as the UE operates as a CUE and receives video packets according to example embodiments described herein.

FIG. 6 illustrates a flow diagram of example operations 600 occurring in a UE of a video streaming system as the UE operates as a CUE and receives video packets. Operations 600 may be indicative of operations occurring in a UE as the UE operates a CUE and receives video packets streamed by a video source.

Operations 600 may begin with the UE receiving video packets (block 605). The video packets may include encoded packets of different video layers. Generally, each encoded packet includes video information for a single video layer. As an example, a video packet may include an encoded packet of a base layer, an encoded packet of a priority layer 2, or an encoded packet of a priority layer 3. The UE may attempt to decode the video packets (block 607). In general, the UE may wait until it receives a block of video packets, i.e., a GOP, and decode the video packets in the block of video packets. Because each video packet includes video information for a single video layer, the UE may attempt to decode the encoded packets for each of the different video layers separately. Collectively, blocks 605 and 607 may be referred to as the broadcast phase.

The UE may perform a check to determine if it was able to decode the encoded packets of all layers of the video packets (block 609). If the UE was not able to decode all of the encoded packets of all layers of the video packets, the UE may not be capable of operating as a CUE, so it may operate as a TUE (block 611) and operations 600 may terminate. If the UE was able to decode all of the encoded packets of all layers of the video packets, the UE may be capable of operating as a CUE.

The UE may transmit a CUE indicator (block 613). The UE may transmit, i.e., broadcast, the CUE indicator to inform other UEs that it is able to operate as a CUE and is capable of assisting UE having problems decoding video packets to meet their respective QoE requirements. The UE may transmit the CUE indicator using D2D links so that resources of the communications system are not utilized. It is noted that more than one UE may operate as CUEs. When multiple UE are operating as CUEs, the CUEs may operate cooperatively, which may involve coordination, to help reduce the workload required of each CUE. As an example, the CUEs may divide the number of supplemental packets that they need to generate so that the number of supplemental packets generated per CUE is reduced. The cooperation between the CUEs may occur occasionally, such as once per specified number of video packet blocks, or on a per video packet block basis.

The UE may receive feedback from UEs operating as TUEs (block 615). The feedback from the TUEs may include information regarding the decoding performance of the individual TUEs. The feedback may be provided occasionally, such as once per specified number of video packet blocks, or on a per video packet block basis. As an illustrative example, the feedback from a single TUE may include a QoE requirement of the TUE, a highest encoded layer that the TUE was able to successfully decode, and a number of supplemental packets needed by the TUE to decode its first unsuccessfully decoded layer. As another illustrative example, the feedback from a single TUE may include a QoE requirement of the TUE, as well as historical decoding performance for the TUE, such as its packet decode rate for a lowest layer that it is not fully successful in decoding.

It is noted that although the discussion focusses on the UE operating as the CUE receiving feedback from TUEs and then generating supplemental packets, the UE may still be able to operate as CUE without receiving feedback. As an example, the CUE may be configured to automatically generate a specified number of supplemental packets and broadcast the supplemental packets. The specified number may be specified by an operator of the communications system and may be generated in accordance with historically recorded information, such as packet erasure rates recorded by a video source using reported channel information about video broadcasting performance, for example. As another example, the UE may have knowledge of channel conditions (e.g., channel quality information, channel state information, channel parameters, and the like) in its portion of the communications system, and the UE may estimate the number of supplemental packets to generate in accordance with the channel condition. As yet another example, the UE may generate and transmit supplemental packets until it receives an acknowledgement from the TUEs. As yet another example, the CUE may be configured to automatically generate supplemental packets that correspond to one or more enhancement layers, based on the assumption that most TUEs can decode the base layer. As yet another example, the specified number of supplemental packets may be determined by the availability of D2D link resources, and UE cooperation is operated on a "best-effort" mode.

Figure 7A:
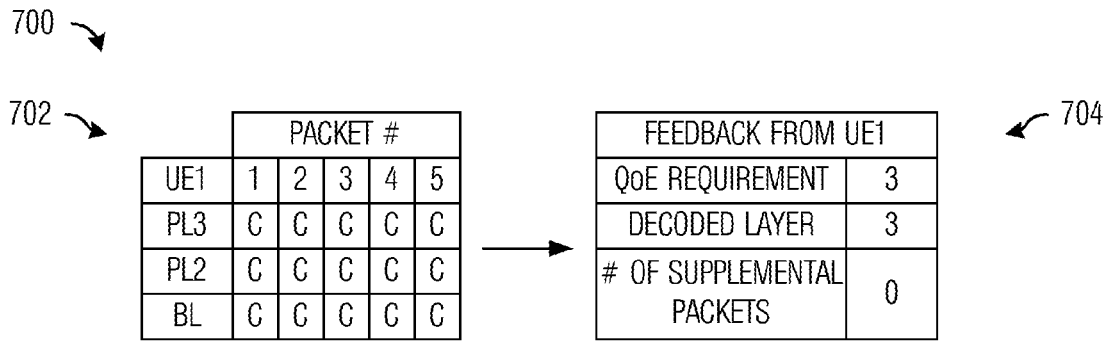
FIG. 7*a* illustrates a diagram of an example feedback generated by a first UE according to example embodiments described herein.

FIG. 7a illustrates a diagram 700 of an example feedback generated by a first UE. For discussion purposes, consider a video packet block comprising 5 packets (numbered 1-5) with each packet including a base layer (BL) packet, a priority layer 2 (PL2) packet, and a priority layer 3 (PL3) packet. A decoding result block 702 represents the first UE's decoding of the video packet block, with a 'C' indicating that the first UE was able to decode the corresponding packet and an 'E' indicating that the first UE was not able to decode the corresponding packet. As shown in FIG. 7a, the first UE was able to decode all packets of the video packet block. A first feedback 704 represents the feedback from the first UE. As shown in first feedback block 704, the first UE has a QoE requirement of 3, indicating that the first UE has to be able to decode packets from all three layers (BL, PL2, and PL3) in order to meet its QoE requirement. Furthermore, first feedback block 704 indicates that the first UE was able to decode layer 3 (PL3) which implicitly conveys that the first UE was also able to decode layers 1 and 2 (BL and PL2). Additionally, first feedback block 704 indicates that the first UE does not need any supplemental packets, since it was able to decode all packets of the video packet block.

Figure 7B:
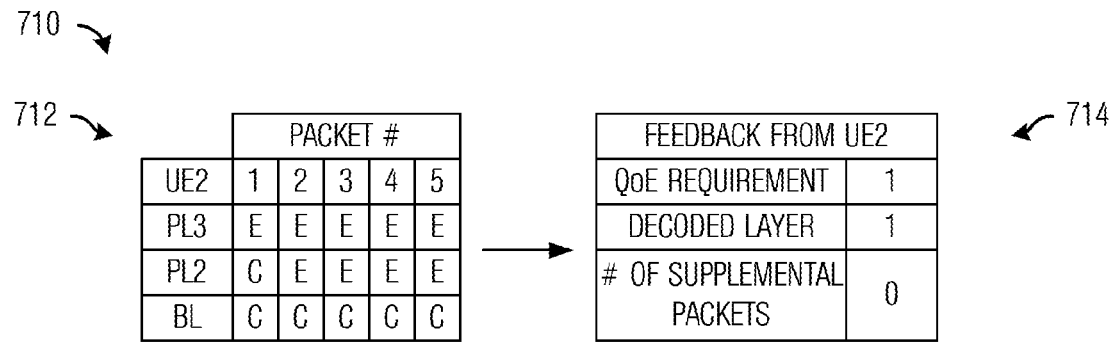
FIG. 7*b* illustrates a diagram of an example feedback generated by a second UE according to example embodiments described herein.

FIG. 7b illustrates a diagram 710 of an example feedback generated by a second UE. For discussion purposes, consider the same video packet block as discussed for FIG. 7a is used herein. A decoding result block 712 indicates that the second UE was able to decode all packets of BL, but only 1 packet of PL2 and 0 packets of PL3. However, as shown in second feedback 714, the QoE requirement of the second UE is 1, indicating that the second UE only has to be able to decode packets of the first layer (BL) in order to meet its QoE requirement. Furthermore, second feedback block 714 indicates that the second UE was able to decode layer 1 (BL), thereby meeting its QoE requirement. Additionally, second feedback block 714 indicates that the second UE does not need any supplemental packets, since it was able to decode all packets of BL.

Figure 7C:
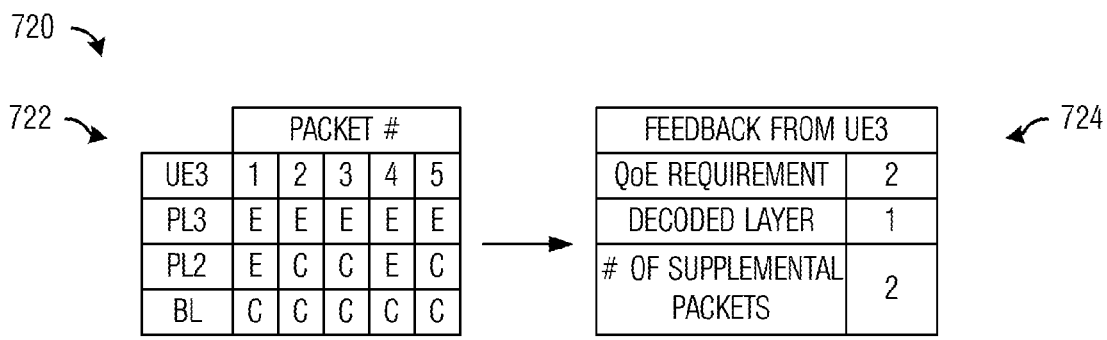
FIG. 7*c* illustrates a diagram of an example feedback generated by a third UE according to example embodiments described herein.

FIG. 7c illustrates a diagram 720 of an example feedback generated by a third UE. For discussion purposes, consider the same video packet block as discussed for FIG. 7a is used herein. A decoding result block 722 indicates that the third UE was able to decode all packets of BL, but only 3 packet of PL2 and 0 packets of PL3. However, as shown in third feedback 724, the QoE requirement of the third UE is 2, indicating that the third UE has to be able to decode packets of the first layer (BL) and of priority layer 2 (PL2) in order to meet its QoE requirement. Furthermore, third feedback block 714 indicates that the third UE was able to decode layer 1 (BL), therefore the third UE was not able to meet its QoE requirement. Additionally, third feedback block 714 indicates that the third UE needs 2 supplemental packets for PL2 in order for it to decode PL2.

Figure 7D:
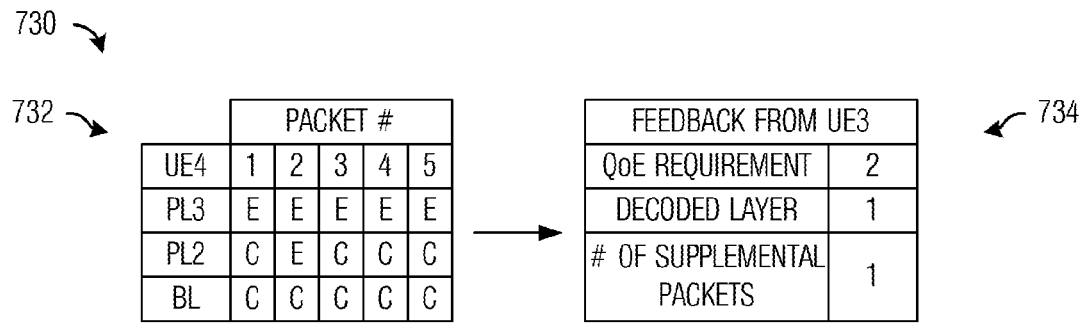
FIG. 7*d* illustrates a diagram of an example feedback generated by a fourth UE according to example embodiments described herein.

FIG. 7d illustrates a diagram 730 of an example feedback generated by a fourth UE. For discussion purposes, consider the same video packet block as discussed for FIG. 7a is used herein. A decoding result block 732 indicates that the fourth UE was able to decode all packets of BL, but only 4 packet of PL2 and 0 packets of PL3. However, as shown in fourth feedback 734, the QoE requirement of the fourth UE is 2, indicating that the fourth UE has to be able to decode packets of the first layer (BL) and of priority layer 2 (PL2) in order to meet its QoE requirement. Furthermore, fourth feedback block 734 indicates that the fourth UE was able to decode layer 1 (BL), therefore the fourth UE was not able to meet its QoE requirement. Additionally, fourth feedback block 734 indicates that the fourth UE needs 1 supplemental packet for PL2 in order for it to decode PL2.

Figure 7E:
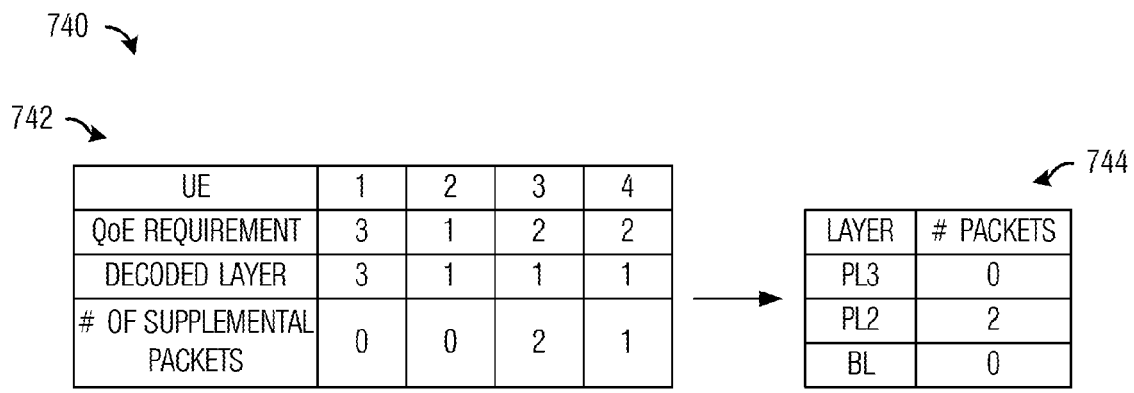
FIG. 7e illustrates a diagram of an example determination of supplemental packets according to example embodiments described herein.
Figure 7F:
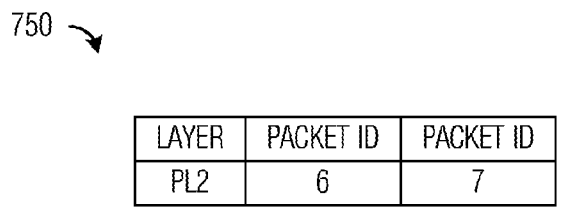
FIG. 7f illustrates a diagram of example packet identifiers of the 2 supplemental packets generated for PL2 according to example embodiments described herein.

FIG. 7e illustrates a diagram 740 of an example determination of supplemental packets. For discussion purposes, consider the same video packet block as discussed for FIG. 7a is used herein. A feedback block 742 illustrates the feedback received from the four UEs. Based on the feedback (including the QoE requirements and the number of supplemental packets required) from the four UEs, the UE that is operating as a CUE is able to determine that it only has to generate supplemental packets for PL2. For PL2, the UE has to generate 2 supplemental packets for the third UE and 1 supplemental packet for the fourth UE. However, since supplemental packets may replace any undecodable packet of a particular video layer, the UE does not have to generate 2 supplemental packets for the third UE and 1 supplemental packet for the fourth UE. Instead, one of the 2 supplemental packets generated for the third UE may also be used by the fourth UE. So, the UE has to only generate a total of 2 supplemental packets. FIG. 7f illustrates a diagram 750 of example packet identifiers of the 2 supplemental packets generated for PL2. The UE does not have to generate any supplemental packets for BL or PL3. It is noted that the example discussed in FIGS. 7a-7f are intended for illustrative purposes only and are applicable to the situation discussed therein and that different situations may result in the generation of different numbers of supplemental packets for different layers.

Referring back now to FIG. 6, the UE may generate supplemental packets for the TUEs in accordance with the feedback received from the TUEs (block 617). In general, a supplemental packet supplements (or augments) encoded information for a single video packet of a single video layer and allows the UE to decode the single video packet. Since due to the nature of the rateless codes used to encode the layers of the video, the UE can generate supplemental packets for the layers of the video without knowing the specific packets the TUEs were unable to decode successfully. As an illustrative example, if from the feedback received from the TUE, the UE knows that it needs to generate 2 supplemental packets for the base layer, 3 supplemental packets for the priority layer 2, and 4 supplemental packets for the priority layer 3, the UE may simply generate the required number of supplemental packets. The UE may estimate a maximum number of supplemental packets required to forward to UEs so that they can decode with high probability, e.g., $Pr(PSNR \geq PSNR_{target}) \geq 1 - P_{outage}$, where PSNR is the peak-signal-to-noise ratio, $PSNR_{target}$ is the PSNR that a TUE needs to satisfy its own QoE requirement, and $P_{outage}$ is the maximum outage probability that a TUE can accept that is not meeting its own PSNR target. If there are packet losses in the links, e.g., D2D links, between the UE and the TUEs, the number of supplemental packets forwarded can take that into account. The UE may transmit the supplemental packets (block 619). Since the supplemental packets are not specific for any TUE, the UE may broadcast the supplemental packets using the D2D links to the TUEs and the TUEs may use the supplemental packets as needed to decode the various layers of the video in order to meet their respective QoE requirements. The UE may perform a check to determine if the video is complete (block 621). If the video is not complete, the UE may return to block 617. If the video is complete, operations 600 may terminate. Collectively, blocks 613-621 may be referred to as the cooperation phase.

Figure 8:
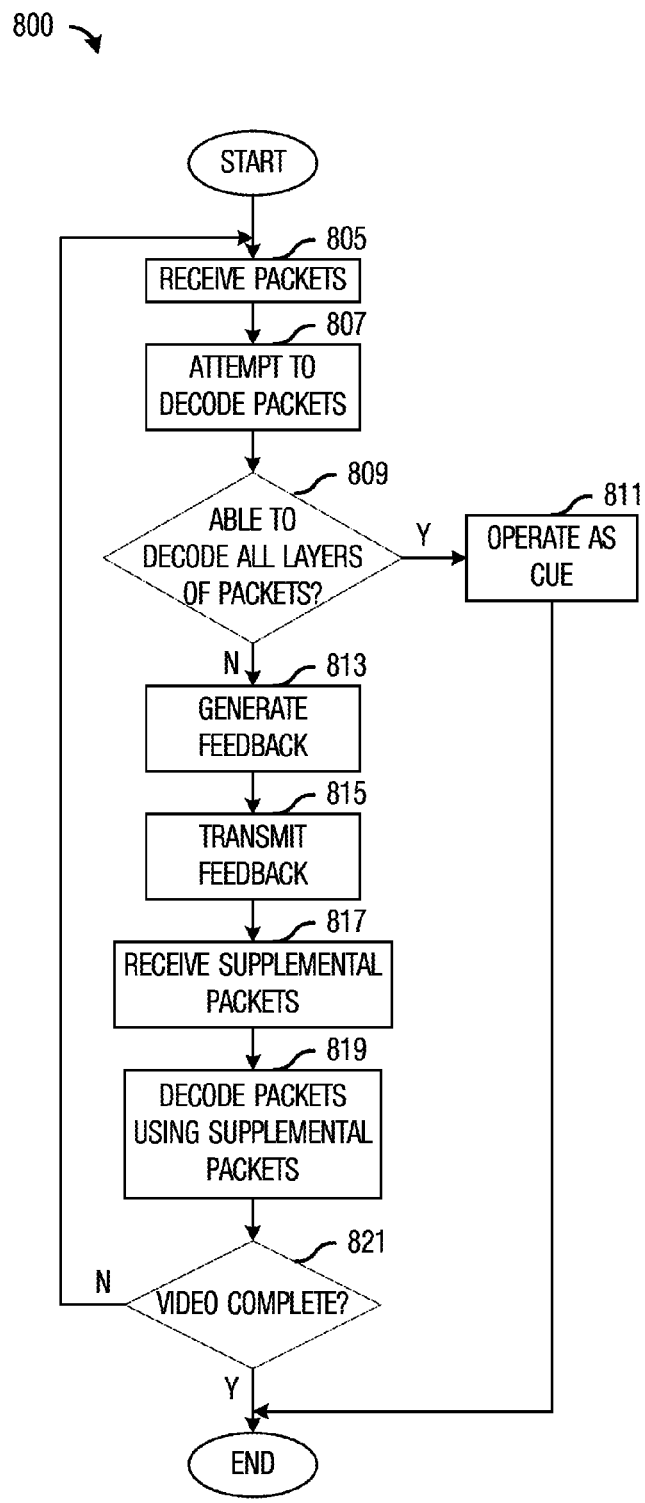
FIG. 8 illustrates a flow diagram of example operations occurring in a UE of a video streaming system as the UE operates as a TUE and receives video packets according to example embodiments described herein.

FIG. 8 illustrates a flow diagram of example operations 800 occurring in a UE of a video streaming system as the UE operates as a TUE and receives video packets. Operations 800 may be indicative of operations occurring in a UE as the UE operates a TUE and receives video packets streamed by a video source.

Operations 800 may begin with the UE receiving video packets (block 805). The video packets may include encoded packets of different video layers. As an example, a video packet may include an encoded packet of a base layer, an encoded packet of a priority layer 2, or an encoded packet of a priority layer 3. The UE may attempt to decode the video packets (block 807). In general, the UE may wait until it receives a block of video packets, i.e., a GOP, and decode the video packets in the block of video packets. Because each video packet includes video information for a single video layer, the UE may attempt to decode the encoded packets for each of the different video layers separately. Collectively, blocks 805 and 807 may be referred to as the broadcast phase.

The UE may perform a check to determine if it was able to decode the encoded packets of all layers of the video packets (block 809). If the UE was able to decode all of the encoded packets of all layers of the video packets, the UE may be capable of operating as a CUE (block 811) and operations 800 may terminate. If the UE was not able to decode all of the encoded packets of all layers of the video packets, the UE may be capable of operating as a TUE.

The UE may generate feedback indicating its decoding performance (block 813). The UE may generate the feedback based on its ability to decode the individual layers of the video packets as well as its QoE requirement. The UE may maintain a record of its ability to decode packets of the individually encoded layers, up to and including a target layer that corresponds to its QoE requirement. As an illustrative example, if the QoE requirement of the UE corresponds to priority layer 2, the UE may maintain a record of its ability to decode packets for base layer and priority layer 2.

According to an example embodiment, the UE may report the feedback on a video packet block basis. When reporting feedback on a video packet block basis, the UE may maintain a record of its ability to decode packets for each video packet block and after it has received the video packets comprising a video packet block and attempted to decode the video packets, provide feedback to the CUE(s). Please refer to FIGS. 7a-7d for illustrative examples of feedback generation on a per video packet block basis.

According to an example embodiment, the UE report the feedback using long term signaling. When reporting feedback using long term signaling, the UE may maintain a record of its ability to decode packets. As an illustrative example, the UE may estimate its own long term packet erasure rate for each layer using its records of its ability to decode packets. If, for example, the UE has historically been able to decode 4 out of 5 packets of PL2, the UE may estimate its packet erasure rate for PL2 to be 20%. The UE may report the feedback (which may include its QoE requirement and packet erasure rate for layers corresponding to the QoE requirement) periodically or upon occurrence of an event, such as receipt of a command or instruction to report the feedback or its inability to recover the video packets needed to meet its QoE requirement.

It is noted that although the discussion focusses on the UE operating as the TUE generating feedback to provide to the CUE(s), the UE may be able to operate without having to provide feedback. As an example, the CUE may be configured to automatically generate a specified number of supplemental packets and broadcast the supplemental packets. The specified number may be specified by an operator of the communications system and may be generated in accordance with historically recorded information, such as packet erasure rates recorded by a video source using reported channel information about video broadcasting performance, for example. As another example, the UE may have knowledge of channel conditions in its portion of the communications system, and the UE may estimate the number of supplemental packets to generate in accordance with the channel condition. As yet another example, the UE may generate and transmit supplemental packets until it receives an acknowledgement from the TUEs. As yet another example, the CUE may be configured to automatically generate supplemental packets that correspond to one or more enhancement layers, based on the assumption that most TUEs can decode the base layer. As yet another example, the specified number of supplemental packets may be determined by the availability of D2D link resources, and UE cooperation is operated on a "best-effort" mode.

The UE may transmit the feedback (block 815). The UE may receive supplemental packets in accordance with the feedback that it provided to the CUE(s) (block 817). It is noted that due to the broadcast nature of the transmission of supplemental packets, the UE may receive supplemental packets even if it does not need any. In such a situation, the UE may ignore the supplemental packets. If the UE does need the supplemental packets, the UE may use the supplemental packets to decode the video packets that it was not able to decode (block 819). The UE may perform a check to determine if the video is complete (block 821). If the video is complete, operations 800 may terminate. If the video is not complete, the UE may return to block 805 to receive additional video packets.

Figure 9:
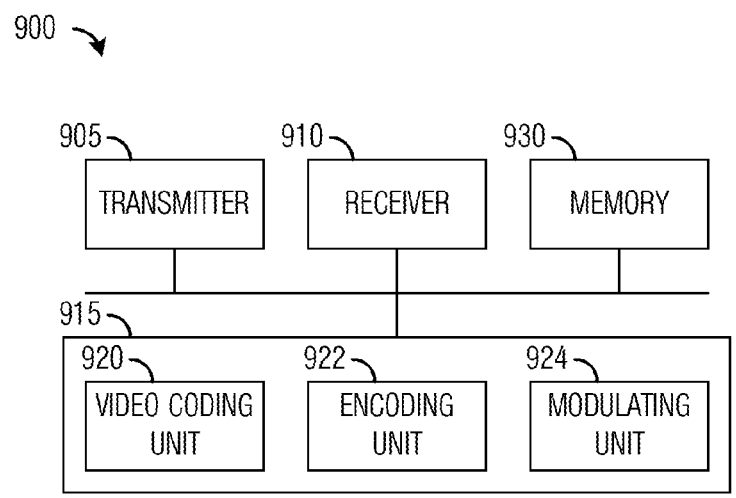
FIG. 9 illustrates a first example communications device according to example embodiments described herein.

FIG. 9 illustrates a first example communications device 900. Communications device 900 may be an implementation of a video source, such as an eNB, a base station, a multimedia server, and the like. Communications device 900 may be used to implement various ones of the embodiments discussed herein. As shown in FIG. 9, a transmitter 905 is configured to transmit video packets, and the like. Communications device 900 also includes a receiver 910 that is configured to receive packets, and the like.

A video coding unit 920 is configured to encode a video stream to produce multiple separate video layers. Video coding unit 920 is configured to use SVC to encode the video stream. An encoding unit 922 is configured to separately encode each video layer of the video stream. Encoding unit 922 is configured to use a rateless code, such as a fountain code, a network code, and the like, to encode the video layers. A modulating unit 924 is configured to modulate the separately encoded video layers using HM. Modulating unit 924 is configured to use H-QAM to modulate the separately encoded video layers. A memory 930 is configured to store video streams, video layers, encoded video layers, modulated video packets, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while video coding unit 920, encoding unit 922, and modulating unit 924 may be software modules executing in a microprocessor (such as processor 915) or a custom circuit or a custom compiled logic array of a field programmable logic array. Video coding unit 920, encoding unit 922, and modulating unit 924 may be modules stored in memory 930.

Figure 10:
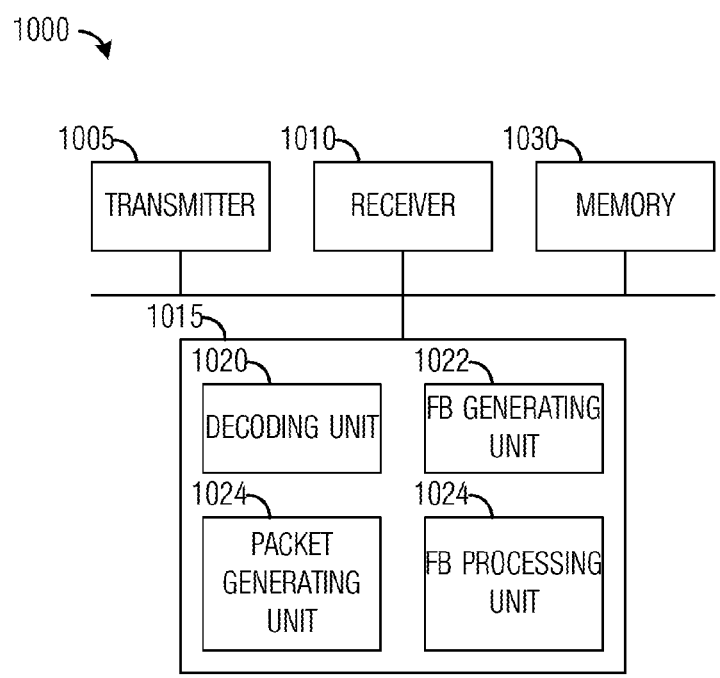
FIG. 10 illustrates a second example communications device according to example embodiments described herein.

FIG. 10 illustrates a second example communications device 1000. Communications device 1000 may be an implementation of a video source, such as an eNB, a base station, a multimedia server, and the like. Communications device 1000 may be used to implement various ones of the embodiments discussed herein. As shown in FIG. 10, a transmitter 1005 is configured to transmit video packets, supplemental packets, feedback, indicators, and the like. Communications device 1000 also includes a receiver 1010 that is configured to receive video packets, supplemental packets, feedback, indicators, and the like.

A decoding unit 1020 is configured to decode received video packets. Decoding unit 1020 is configured to decode received video packets using supplemental packets. Decoding unit 1020 is configured to generate a CUE indicator if communications device was able to decode all received packets and is capable of operating as a CUE. A feedback (FB) processing unit 1022 is configured to generate feedback in accordance with decoding performance of communications device 1000. FB generating unit 1022 is configured to generate feedback on a video packet block basis. FB generate unit 1022 is configured to generate packet erasure information. A packet generating unit 1024 is configured to generate supplemental packets in accordance with feedback received from TUE. Packet generating unit 1024 is configured to use received video packets and feedback to generate the supplemental packets. A FB processing unit 1024 is configured to process feedback received from TUE to determine which (if any) supplemental packets are needed. A memory 1030 is configured to store video packets, supplemental packets, feedback, the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while decoding unit 1020, FB generating unit 1022, packet generating unit 1024, and FB processing unit 1024 may be software modules executing in a microprocessor (such as processor 1015) or a custom circuit or a custom compiled logic array of a field programmable logic array. Decoding unit 1020, FB generating unit 1022, packet generating unit 1024, and FB processing unit 1024 may be modules stored in memory 1030.

Although the present disclosure and its advantages have been described in detail, it should be understood that various changes, substitutions and alterations can be made herein without departing from the spirit and scope of the disclosure as defined by the appended claims.

What is claimed is:

1. A method for operating a cooperating user equipment (CUE), the method comprising:
   receiving, by the CUE, a plurality of video packets transmitted from a video source using hierarchical modulation, with each video packet corresponding to a separately encoded video layer that is encoded with a rateless code, wherein video packets corresponding to different layers are modulated together;
   decoding, by the CUE, the plurality of video packets;
   receiving, by the CUE from a target user equipment (TUE), feedback comprising a quality of experience requirement for the TUE and a packet erasure percentage for a first video layer;
   generating, by the CUE in accordance with the feedback, one or more supplemental packets to assist in the decoding of the plurality of video packets; and
   transmitting, by the CUE, the one or more supplemental packets.

2. The method of claim 1, wherein the feedback comprises the quality of experience requirement and information about video packet decoding performance for the TUE.

3. The method of claim 2, wherein the information about video packet decoding performance for the TUE comprises a number of supplemental packets needed for at least one of the different layers, and wherein generating the one or more supplemental packets comprises generating the number of supplemental packets for the at least one of the different layers.

4. The method of claim 3, wherein the feedback is received from a plurality of TUEs, and wherein generating the one or more supplemental packets comprises generating a largest of the number of supplemental packets.

5. The method of claim 1, wherein generating the one or more supplemental packets in accordance with the feedback comprises:
   determining a number of supplemental packets in accordance with the feedback; and
   generating the number of supplemental packets.

6. The method of claim 1, wherein the feedback comprises the packet erasure percentage for the first video layer, and wherein generating the one or more supplemental packets in accordance with the feedback comprises:
   determining a number of supplemental packets needed by the TUE from the packet erasure percentage; and
   generating the number of supplemental packets.

7. The method of claim 6, wherein the feedback is received in long term signaling.

8. The method of claim 1, further comprising determining channel quality information for a TUE, and wherein generating the one or more supplemental packets comprises generating the one or more supplemental packets in accordance with the channel quality information.

9. The method of claim 8, wherein the channel quality information is received from the video source.

10. The method of claim 1, further comprising:
    repeating generating the one or more supplemental packets, and transmitting the one or more supplemental packets until the CUE has received an acknowledgement from a TUE indicating that it has been able to decode the plurality of video packets.

11. The method of claim 1, wherein the one or more supplemental packets are encoded with the rateless code.

12. The method of claim 1, wherein the one or more supplemental packets are transmitted on a device to device (D2D) communications link.

13. The method of claim 1, wherein the plurality of video packets are hierarchically modulated using hierarchical quadrature amplitude modulation (H-QAM).

14. A method for operating a target user equipment (TUE), the method comprising:
    receiving, by the TUE, a plurality of video packets transmitted from a video source using hierarchical modulation (HM), with each video packet corresponding to a separately encoded video layer that is encoded with a rateless code, wherein video packets corresponding to different layers are modulated together;
    decoding, by the TUE, a subset of the plurality of video packets;
    generating, by the TUE, feedback comprising a quality of experience requirement for the TUE and a packet erasure percentage for a first video layer;
    transmitting the feedback to a cooperating user equipment (CUE);
    receiving, by the TUE from the CUE, one or more supplemental packets generated by the CUE in accordance with the feedback to assist in the decoding of the plurality of video packets; and
    decoding, by the TUE, the plurality of video packets utilizing the one or more supplemental packets.

15. The method of claim 14, wherein the feedback comprises the quality of experience requirement and information about video packet decoding performance by the TUE.

16. The method of claim 14, further comprising:
    determining the packet erasure percentage by measuring packet decoding performance for a video layer for a video packet block, wherein the feedback comprises the packet erasure percentage.

17. The method of claim 14, further comprising:
    determining a number of replacement packets needed in accordance with the video packet decoding performance for a video layer for a video packet block, wherein the feedback further comprises the number of replacement packets needed for the video layer.

18. The method of claim 17, wherein transmitting the feedback occurs once per video packet block.

19. The method of claim 14, further comprising transmitting an acknowledgement packet after decoding the plurality of video packets.

20. A user equipment (UE) comprising:
a receiver configured to receive a plurality of video packets transmitted from a video source using hierarchical modulation (HM), with each video packet corresponding to a separately encoded video layer of a plurality of video layers that are encoded with a rateless code, wherein video packets corresponding to different video layers are modulated together;
a processor operatively coupled to the receiver, the processor configured to:
decode at least one video packet of the plurality of video packets;
determine whether all the plurality of video layers have been successfully decoded; and
if all the plurality of video layers have been successfully decoded, receive, from a target user equipment (TUE), feedback comprising a quality of experience requirement for the TUE and a packet erasure percentage for a first video layer;
if all the plurality of video layers have been successfully decoded, generate, in accordance with the feedback, one or more supplemental packets to assist in decoding of the plurality of video packets; and
a transmitter operatively coupled to the processor, the transmitter configured to transmit the one or more supplemental packets if all the plurality of video layers have been successfully decoded.

21. The UE of claim 20, wherein the receiver is further configured to receive feedback from a target user equipment (TUE), and wherein the processor is further configured, if all the plurality of video layers have been successfully decoded, to generate the one or more supplemental packets in accordance with the feedback.

22. The UE of claim 21, wherein the processor is further configured, if all the plurality of video layers have been successfully decoded, to determine a number of supplemental packets in accordance with the feedback, and to generate the number of supplemental packets.

23. The UE of claim 21,
wherein the feedback comprises the packet erasure percentage for the video layer, and
wherein the processor is further configured, if all the plurality of video layers have been successfully decoded, to:
determine a number of supplemental packets for the video layer needed by the TUE from the packet erasure percentage; and
generate the number of supplemental packets.

24. The UE of claim 20, wherein the processor is further configured, if all the plurality of video layers have been successfully decoded, to transmit an indicator that the UE is a cooperating UE.

25. A target user equipment (TUE) comprising:
a receiver configured to:
receive a plurality of video packets transmitted from a video source using hierarchical modulation (HM), with each video packet corresponding to a separately encoded video layer that is encoded with a rateless code, wherein video packets corresponding to different layers are modulated together, and
receive, from a cooperating user equipment (CUE), one or more supplemental packets generated by the CUE, in accordance with feedback from the TUE, to assist in decoding of the plurality of video packets; and
a processor operatively coupled to the receiver, the processor configured to:
decode a subset of the plurality of video packets;
generate the feedback comprising a quality of experience requirement for the TUE and a packet erasure percentage for a first video layer; and
decode the plurality of video packets utilizing the one or more supplemental packets; and
a transmitter operatively coupled to the processor, the transmitter configured to transmit the feedback to the CUE.

26. The TUE of claim 25, wherein the processor is further configured to:
determine the packet erasure percentage for a video layer by measuring packet decoding performance over an extended period of time; and
generate the feedback comprising the packet erasure percentage.

27. The TUE of claim 25, wherein the processor is further configured to:
determine, from the video packet decoding performance for a video packet block, a number of supplemental packets needed for a video layer; and
generate the feedback further comprising the number of supplemental packets needed for the video layer.

* * * * *

UNITED STATES PATENT AND TRADEMARK OFFICE
CERTIFICATE OF CORRECTION

PATENT NO. : 9,584,334 B2
APPLICATION NO. : 14/166235
DATED : February 28, 2017
INVENTOR(S) : Cao et al.

Page 1 of 1

It is certified that error appears in the above-identified patent and that said Letters Patent is hereby corrected as shown below:

On the Title Page

Item (73) Assignee, delete "Futurewei Technologies, Inc., Plano, TX (US)" and insert --Huawei Technologies Co., Ltd., Shenzhen, Guangdong (CN)--.

Signed and Sealed this
Twelfth Day of February, 2019

Andrei Iancu
*Director of the United States Patent and Trademark Office*